(12) United States Patent
Senda

(10) Patent No.: US 6,903,775 B2
(45) Date of Patent: Jun. 7, 2005

(54) LENS UNIT WITH LOCAL CONTROL BY THE LENS UNIT OR REMOTE CONTROL BY A CAMERA UNIT AND WITH DETECTING OF SIGNAL FROM CAMERA UNIT

(75) Inventor: Akira Senda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 09/103,398

(22) Filed: Jun. 24, 1998

(65) Prior Publication Data

US 2003/0095199 A1 May 22, 2003

(30) Foreign Application Priority Data

Jun. 26, 1997 (JP) .............................................. 9-170068

(51) Int. Cl.$^7$ ........................ G03B 13/00; H04N 5/232
(52) U.S. Cl. ........................ 348/345; 348/211.4; 396/79
(58) Field of Search ............................. 348/345, 207.1, 348/357, 211.4, 211.5; 396/77, 79, 80

(56) References Cited

U.S. PATENT DOCUMENTS

| | | | | |
|---|---|---|---|---|
| 4,404,595 A | * | 9/1983 | Ushiro et al. ................ | 348/357 |
| 4,581,647 A | * | 4/1986 | Vye ............................. | 348/212 |
| 4,758,854 A | | 7/1988 | Saegusa ....................... | 354/286 |
| 5,157,431 A | * | 10/1992 | Mabuchi et al. .............. | 396/80 |
| 5,191,373 A | * | 3/1993 | Nakano ....................... | 396/287 |
| 5,274,414 A | * | 12/1993 | Taniguchi et al. ............. | 396/79 |
| 5,420,721 A | * | 5/1995 | Kanno et al. ................. | 396/133 |
| 6,130,717 A | * | 10/2000 | Arai et al. .................... | 348/222 |
| 2002/0047912 A1 | * | 4/2002 | Mabuchi et al. ............. | 348/345 |
| 2002/0122122 A1 | * | 9/2002 | Senda .......................... | 348/345 |

FOREIGN PATENT DOCUMENTS

| | | |
|---|---|---|
| EP | 0 497 376 | 8/1992 |
| JP | 2-39114 | 2/1990 |
| JP | 2-240613 | 9/1990 |

OTHER PUBLICATIONS

Patent Abstracts of Japan, vol. 14, No. 561 (P–1142) (JP 2–240613, Sep. 25, 1990), Dec. 13, 1990.
Patent Abstracts of Japan, vol. 14, No. 195 (P–1039) (JP 2–39114, Feb. 8, 1990), Apr. 20, 1990.

* cited by examiner

*Primary Examiner*—Wendy R. Garber
*Assistant Examiner*—Jason Whipkey
(74) *Attorney, Agent, or Firm*—Fitzpatrick, Cella, Harper & Scinto

(57) ABSTRACT

A lens unit being connected to the camera unit and being selectively set either in a mode in which control is effected according to a control signal from the lens unit or in a mode in which control is effected according to a control signal from the camera unit, wherein when a signal for setting of mode is not input from the camera unit with a lapse of a predetermined time or more after power on of the power supply, a setting circuit sets the mode in which control is effected according to the control signal from the lens unit.

28 Claims, 7 Drawing Sheets

LENS UNIT WITH LOCAL CONTROL BY THE LENS UNIT OR REMOTE CONTROL BY A CAMERA UNIT AND WITH DETECTING OF SIGNAL FROM CAMERA UNIT

BACKGROUND OF THE INVENTION

1. Field of the Invention

The present invention relates to a lens unit for photography capable of remote/local control to control focus and wobbling mechanisms by power, and a camera system using it.

The lens unit of the present invention solves the problem wherein when a lens unit with a digital serial interface was connected to a camera unit without the interface, there arose the problem that setting was disabled of a mode of the lens unit from the side of the camera unit.

2. Related Background Art

The focus control of the lens unit for photography is effected either by manipulating a focus ring directly by hand or by power-driving a focus mechanism of the lens unit by use of such an actuator as a motor. For power-driving of the focus mechanism, there are a mode (local mode) in which the focus control is carried out based on a control signal outputted in response to manipulation of a demand incorporated in or connected to the lens unit and a mode (remote mode) in which the focus control is carried out based on a control signal from a focus operating means or an autofocus means of a TV camera unit connected to the lens unit or based on a control signal outputted in response to manipulation of a demand on a camera control unit CCU connected to the TV camera unit.

The lens unit has a changeover function for changeover between the local mode and the remote mode and a changeover instruction of mode is given from a mode changeover switch provided in the camera unit or in the CCU to the lens unit.

The changeover function between these remote/local modes is provided as an interface between a large-size TV camera unit, used conventionally in studios etc., and the lens unit. The interface between the large TV camera unit and the lens unit is constructed as a system of so-called parallel connection in which each connector pin is assigned to a signal of one function, using a large connector with many pins. In this system a remote/local changeover signal is sent to the lens unit by use of a dedicated wire through one connector pin. Under this setup, the remote/local signal from the CCU or from the camera unit is transmitted to the photographing lens at the same time as turning on of power, so that either the remote mode or the local mode is set instantly in the lens unit.

On the other hand, in the case of a small-size TV camera unit and a lens unit for this small TV camera, they are connected in parallel by a small connector with less pins. The small TV camera units have been used in such circumstances that a cameraman carried the camera system on the shoulder outdoor to take a picture by himself, and there was no need for the remote mode. Therefore, the conventional interfaces were not provided with the changeover function between the remote mode and the local mode.

However, desires are increasing recently for the autofocus system for outdoor photography as well, and thus the autofocus function is also demanded for the small TV camera units. This raised the necessity for exchange of much information between the small TV camera unit with the autofocus function, and the lens unit. The parallel interface of the small connector is, however, short of connector pins, and thus a digital serial interface is also added to the existing parallel interface, whereby exchange of much information is made by digital signals. Further, the digital serial interface is provided with the changeover function between the remote mode and the local mode of focusing.

At present still many users also possess the small TV camera units without the serial interface and have desires for using the lens unit with the AF function having the serial interface, in a mounted state on the small TV camera unit without the serial interface, though not using the AF function.

When the lens unit with the digital serial interface is mounted on the small TV camera unit without the serial interface, there arises, however, a problem that an instruction of setting of either the remote mode or the local mode cannot be sent from the small TV camera unit to the lens unit, so that the focus operation of the lens unit is disabled.

SUMMARY OF THE INVENTION

One aspect of the application is to provide a lens unit or a camera system, the lens unit being connected to a camera unit and being selectively set either in a mode in which control is effected according to a control signal from the lens unit or in a mode in which control is effected according to a control signal from the camera unit, wherein the lens unit comprises a setting circuit for setting the mode in which control is effected according to the control signal from the lens unit, when communication is absent from the camera unit after turning on of power.

One aspect of the application is to provide a lens unit having a serial interface, wherein when no signal for mode setting is input through a digital serial interface of a small TV camera unit at turning on of power, it is determined that the small TV camera unit mounted is a small TV camera unit without the digital serial interface, and wherein a focus control mode is automatically set in a local mode for controlling the lens unit by a demand incorporated in or connected to the lens unit, whereby the lens unit with the serial interface can be used in combination with the small TV camera unit without the digital serial interface without any trouble.

One aspect of the application is to provide a lens unit or a camera system wherein after turning on of power the focus control mode is first set in the mode in which control is effected according to the control signal from the lens unit and wherein when communication is absent from the camera unit thereafter, the mode in which control is effected according to the control signal from the lens unit is maintained.

One aspect of the application is to provide a lens unit or a camera system, wherein at turning on of power the focus control mode is forced into the mode in which control is effected according to the control signal from the lens unit and wherein when serial digital communication is absent thereafter, the mentioned mode is maintained.

The other objects of the present invention will become more apparent from the embodiments described referring to the drawings.

DESCRIPTION OF THE PREFERRED EMBODIMENTS

First Embodiment

Figure 1:
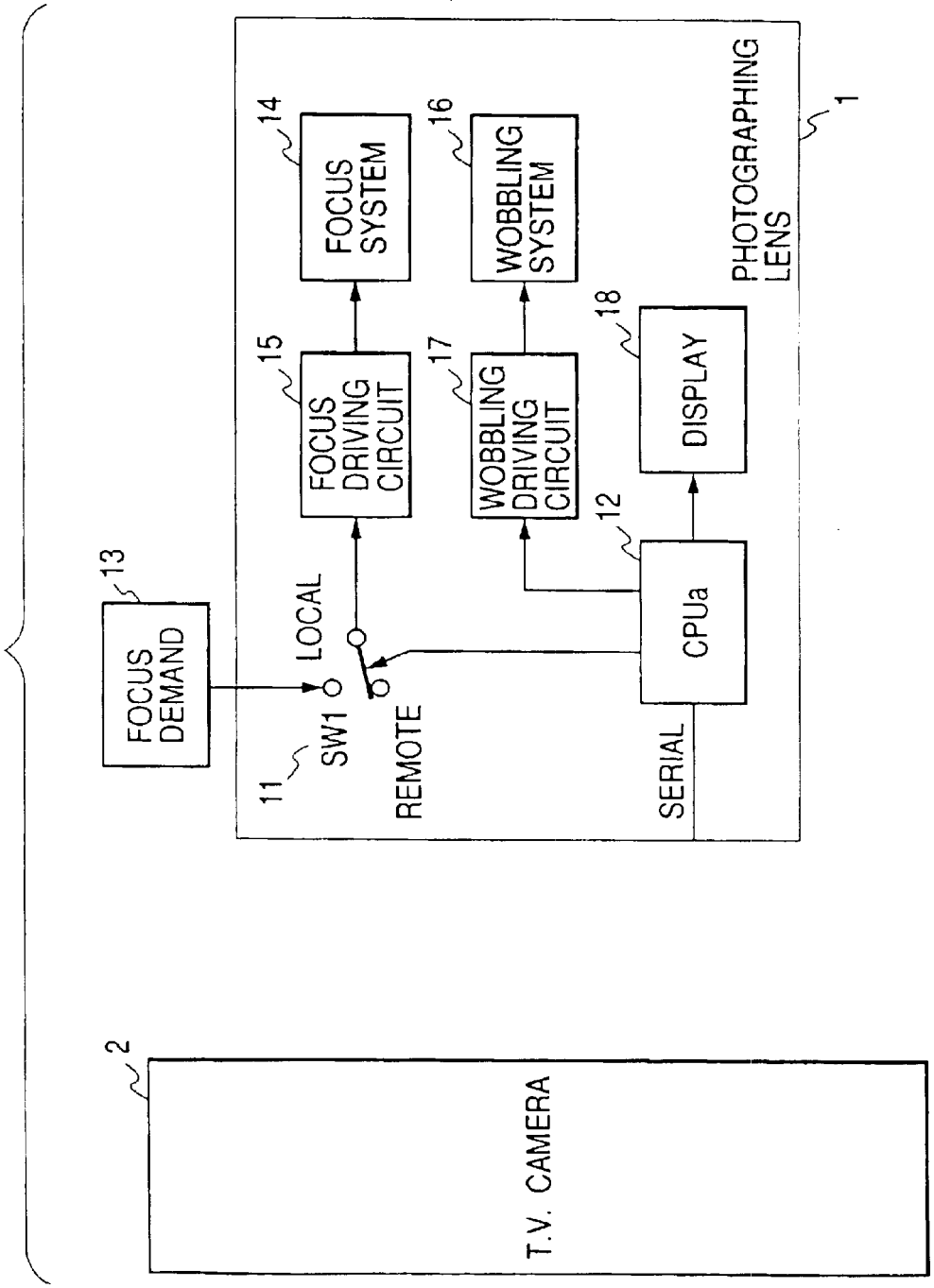
FIG. 1 is a block diagram of a camera system (a combination with a camera unit having no digital interface), which is the first embodiment of the present invention.
Figure 2:
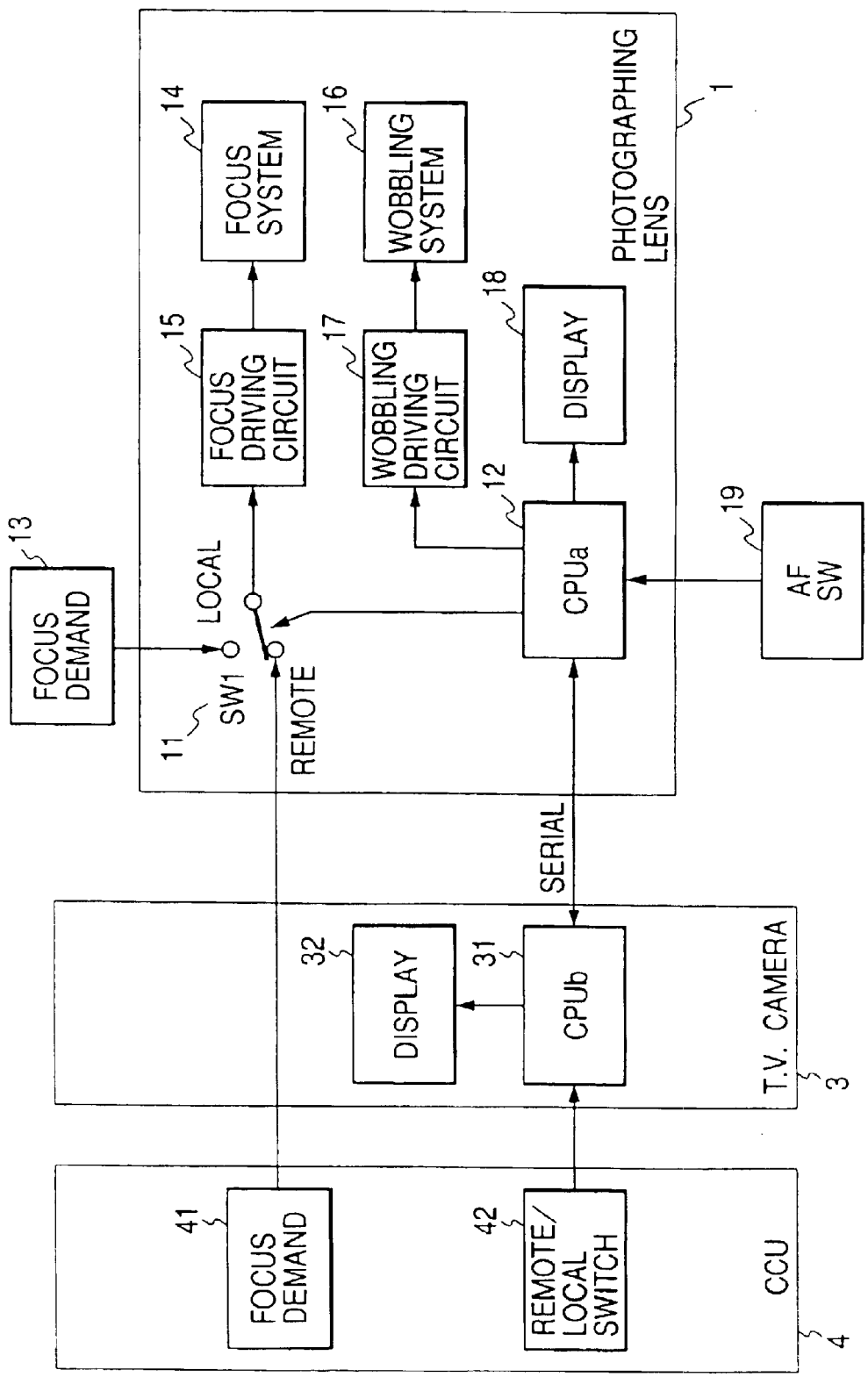
FIG. 2 is a block diagram of a camera system (a combination with a camera unit having a digital interface), which is the first embodiment of the present invention.

FIG. 1 and FIG. 2 illustrate camera systems of the first embodiment of the present invention. The camera system of FIG. 1 is an illustration of a combination of lens unit 1 for photography having a digital serial interface with a small TV camera unit 2 having no digital serial interface.

The lens unit 1 is provided with a remote/local changeover switch (SW1)11 for changeover between the remote mode and the local mode of focus control, a CPUa 12 having a digital serial communication function, a lens focus system 14, a focus driving circuit 15 for driving the focus system 14, a lens wobbling system 16, a wobbling driving circuit 17 for driving the wobbling system 16, and a display 18. An external focus demand 13, which is manipulated by a cameraman, is connected to the remote/local changeover switch (SW1) 11.

The camera system of FIG. 2 is an illustration of a combination of the lens unit 1 for photography having the digital serial interface with a small TV camera unit 3 having a digital serial interface.

The lens unit 1 is the same as that shown in FIG. 1. Numeral 19 designates an AF switch for actuating the AF (autofocus) operation, which is connected from the outside to the CPUa 12 of the lens unit 1.

The small TV camera unit 3 is provided with a CPUb 31 having the serial communication function and a display 32 such as a view finder. The CPUb 31 is connected through the digital serial interfaces to the CPUa 12 of the lens unit 1, whereby the CPUs can exchange much information including information from a remote/local changeover switch 42 as described hereinafter.

A camera control unit (CCU) 4 is connected to the camera unit 3, and this CCU 4 is provided with a focus demand 41 connected to the remote/local changeover switch (SW1) 11 of the lens unit 1, the focus demand 41 being used in the remote mode of focus control, and the remote/local changeover switch 42 for changeover between the remote mode and the local mode.

Figure 3:
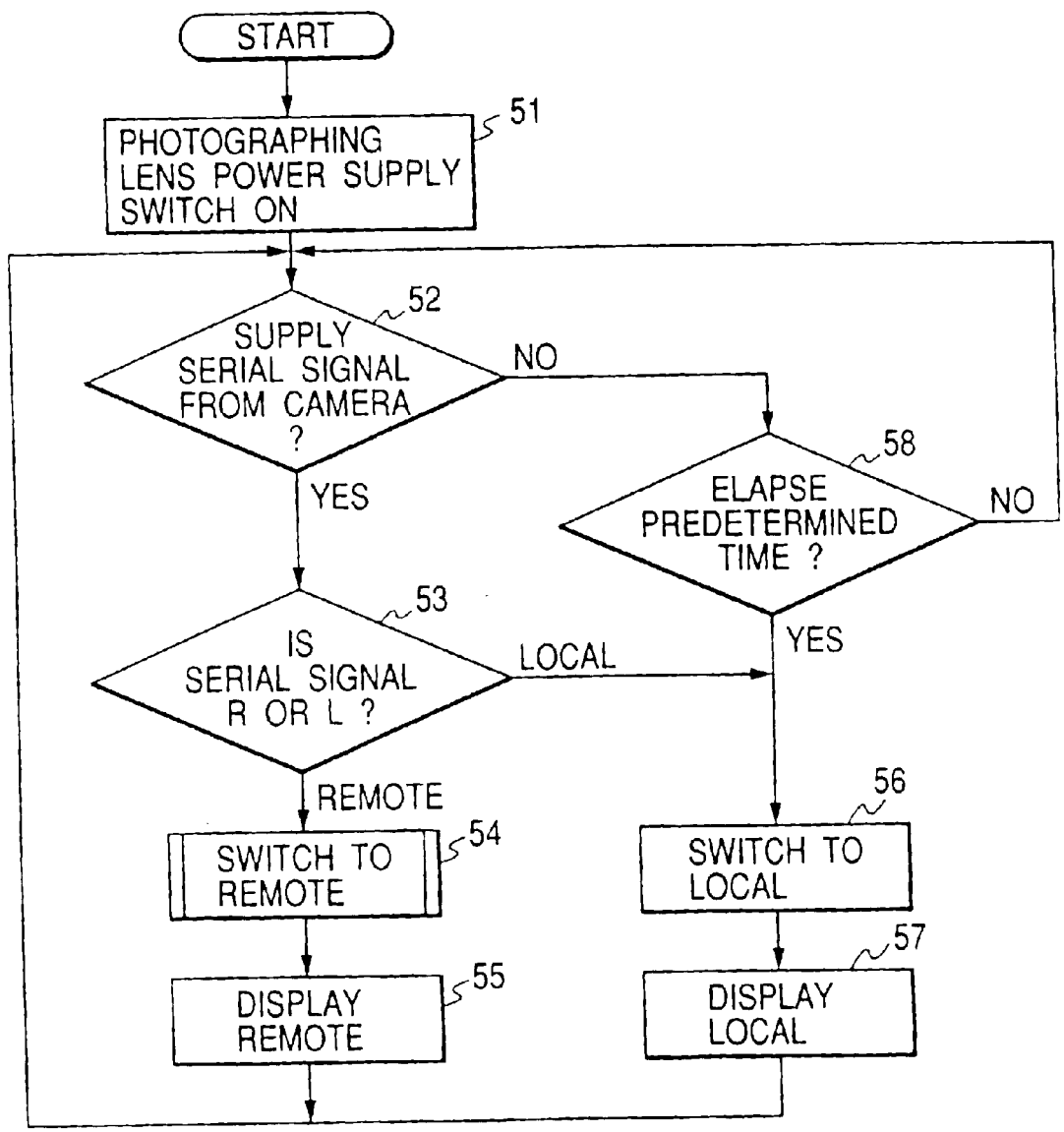
FIG. 3 is an operation flowchart of the lens unit in the above camera system.
Figure 4:
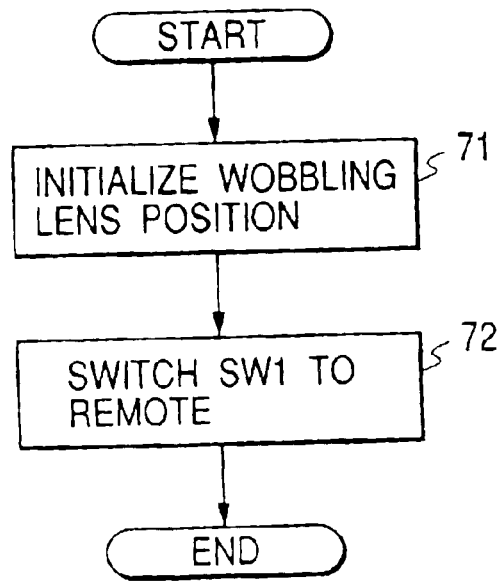
FIG. 4 is a flowchart for setting of the remote mode in the above lens unit.
Figure 5:
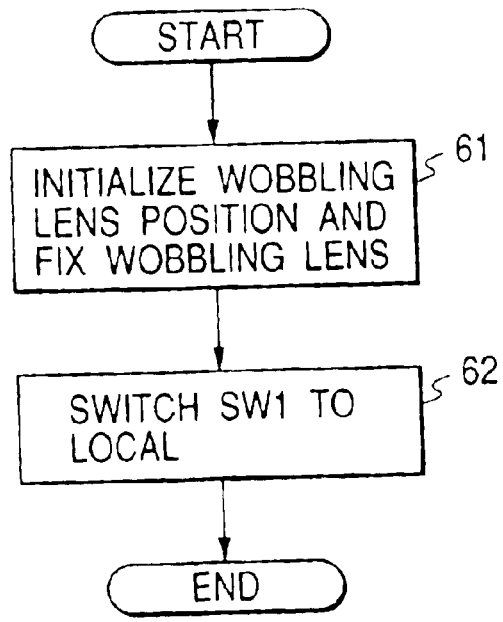
FIG. 5 is a flowchart for setting of the local mode in the above lens unit.

In the camera systems constructed as described above, the CPUa 12 of the lens unit 1 executes the program for setting of focus control mode shown in FIG. 3 to FIG. 5. First, FIG. 3 illustrates the main routine.

In step 51 the CPU detects power on of the power supply of the lens unit 1. The power to the lens unit 1 is supplied from either the camera unit 2 or the camera unit 3. If the camera unit 2 or 3 and the lens unit 1 are electrically connected before power on of the power supply, the power supply of the camera unit 2 or 3 and the lens unit 1 will become on simultaneously accordingly. The lens unit 1 is also allowed to be connected to the camera unit 2 or 3 later in a state where the power is already on in the camera unit 2 or 3.

With detecting power on of the power, the CPU proceeds to step 52 to determine whether there is input of a serial signal (mode setting information, information of manipulation of the focus demand 41, etc.) from the camera unit connected to the lens unit 1. When the camera unit 2 is connected to the lens unit 1, no serial signal is input to the CPUa 12, because the camera unit 2 has no digital serial interface. On the other hand, when the camera unit 3 is connected to the lens unit 1, the CPUb 31 of the camera unit 3 is operating before or starts operating at the same time as the CPUa 12 of the lens unit 1 does, responsive to the up timing of power described above. When the CPUa 12 determines whether a serial signal is input from the camera unit, the serial signal is already outputted from the CPUb 31 of the camera unit 3 or the serial signal will be outputted from the CPUb 31 with a lapse of some time accordingly.

When it is determined in step 52 that no input of serial signal is present, input of a serial signal is awaited for a predetermined time with repeating the routine of step 58 and step 52. When input of a serial signal is absent with a lapse of the predetermined time, it is determined that the camera unit connected has no digital serial interface, and the CPU goes to step 56 to set the focus control mode in the local mode. The specific operation in step 56 will be described hereinafter.

On the other hand, when it is determined in step 52 that there is input of a serial signal, the CPU proceeds to step 53 under a decision that the camera unit connected has the digital serial interface. In step 53 it is determined whether the mode setting information in the serial signal input is an indication of the local mode or an indication of the remote mode. When the mode setting information is one indicating the local mode, the CPU goes to step 56 to set the focus control mode in the local mode. When the mode setting information is one indicating the remote mode, the CPU goes to step 54 to set the focus control mode in the remote mode.

In step 56 the CPU carries out the local mode setting subroutine shown in FIG. 5. In step 61 a wobbling lens (not illustrated) of the wobbling system 16 used in the AF operation is moved to a predetermined position of the origin, which is determined for the cases of operation in photography using a camera without the autofocus function, and is fixed there. Then the CPU proceeds to step 62 to change the remote/local changeover switch (SW1) 11 over to the local position, thus setting the control mode in the local mode.

In step 54 the CPU carries out the remote mode setting subroutine shown in FIG. 4. In step 71 the wobbling lens of the wobbling system 16 used in the AF operation is first moved to the position of the origin, so as to be ready for the wobbling operation with input of an instruction for moving the wobbling lens from the camera unit 3. When the focus manipulation information from the camera unit 3 is input from the focus demand 41 of the CCU 4 at this time (or when the manual focus mode is set in the camera unit 3), the instruction to move the wobbling lens is not input from the camera unit 3, so that the wobbling lens is maintained at the position of the origin. On the other hand, when the autofocus mode is set in the camera unit 3, the instruction to move the wobbling lens is input from the camera unit 3, so as to actuate the wobbling lens.

Then the CPU goes to step 72 to change the remote/local changeover switch (SW1) 11 over to the remote position, thus setting the remote mode.

Figure 6A:
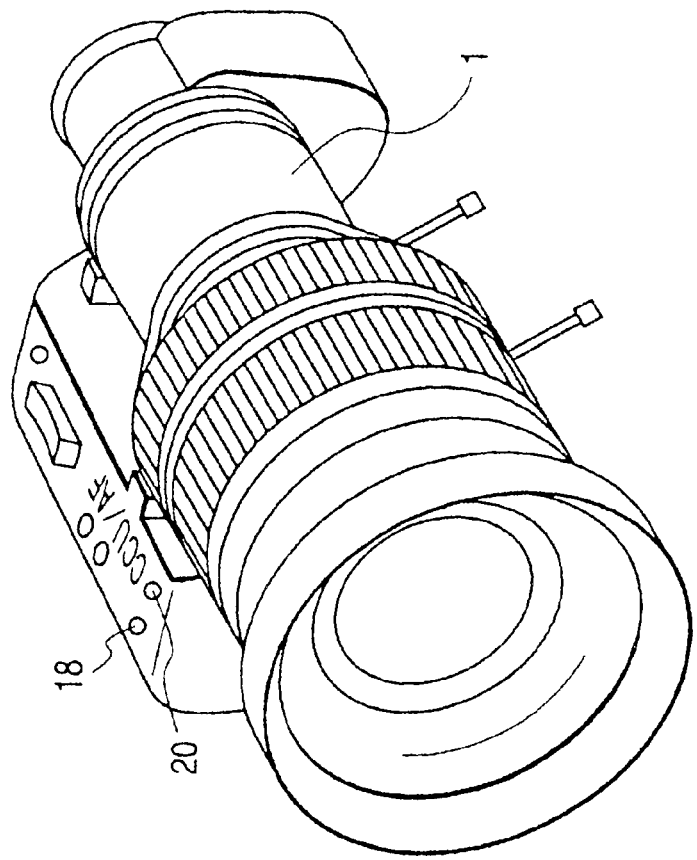
FIG. 6A and FIG. 6B are a perspective external view of the above lens unit and a perspective external view of the focus demand connected to the above lens unit, respectively.

When the remote mode is set in step 54 or when the local mode is set in step 56, as described above, the CPU then moves to step 55 or 57, respectively, to carry out display of focus mode. As shown in FIG. 6A, the lens unit 1 is provided with a display lamp (the display 18 shown in FIG. 1) for indicating setting of the remote mode by an off state thereof and indicating setting of the local mode by an on state. Going to step 55, the CPU turns this display lamp 18 off; going to step 57, the CPU turns the display lamp 18 on to display the focus mode currently set.

Figure 6B:
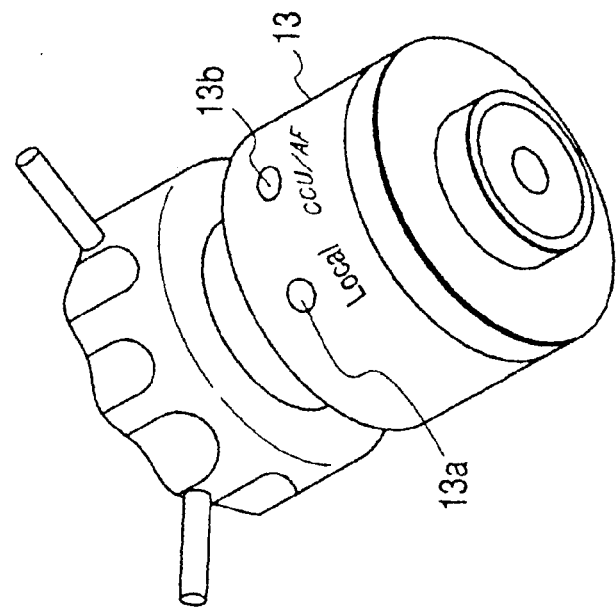

It can also be contemplated that the focus demand 13 is provided with a display lamp 13a as shown in FIG. 6B and this display lamp 13 is turned off or on in step 55 or 57.

Figure 7A:
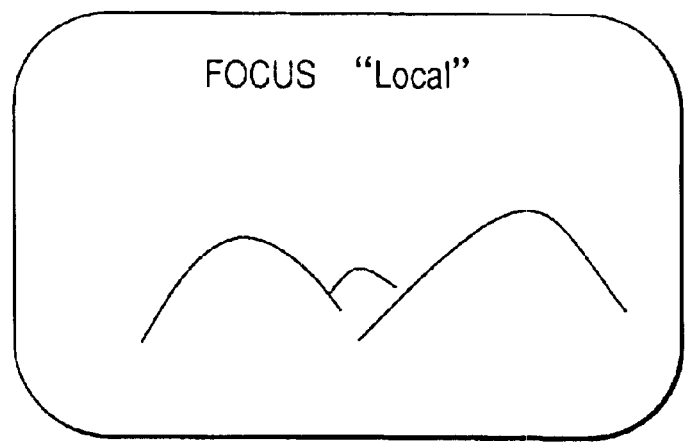
FIG. 7A, FIG. 7B, and FIG. 7C are display examples in the view finder of the camera unit connected to the lens unit.

In a further possible setup, where the camera unit 3 is connected to the lens unit 1, the CPUb 31 of the camera unit 3 functions, as shown in FIG. 7A, to make the display 32 display the focus control mode set at present (the local mode in the figure) in the view finder of the camera unit 3.

When the remote mode is set according to the program described above, the lens unit 1 controls the focus system 14, based on the manipulation information of the focus demand 41 in the CCU 4, as one control form in the remote mode. As another control form, when the AF switch 19 connected to the lens unit 1 is depressed, the focus system 14 is controlled based on the AF information from the CPUb 31 of the camera unit 3. The AF information is input to the lens unit 1 as a signal for moving the focus system 14 and the wobbling system 16, which is obtained in such a way that the CPUb 31 processes an electric video signal outputted from such an image pickup device as a CCD not illustrated in the camera unit 3 in accordance with an image projected thereon through the lens unit 1.

Figure 7B:
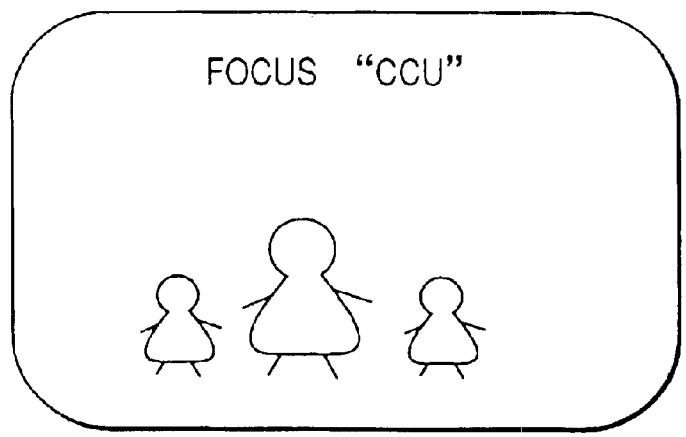
Figure 7C:
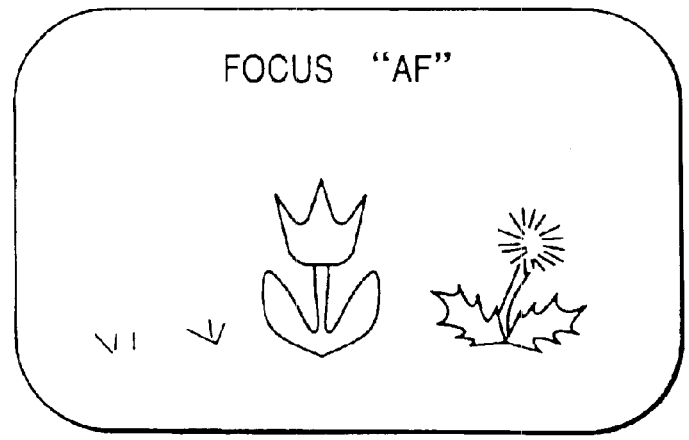

From the side of the lens unit 1, there is no difference between the focus control based on the manipulation information of the focus demand 41 of the CCU 4 and the focus control based on the AF information from the camera unit 3 in the sense that the focus control of the lens unit 1 is carried out according to the information from the camera unit, but it is more convenient for the cameraman to be informed of the difference between the control forms. It is thus desirable in step 55 described above to display setting of the remote mode as described above and to display CCU/AF (the focus control according to the manipulation information from the CCU 4/the focus control according to the AF information from the camera unit 3) by turning on/off of a display lamp 20 or 13b or to display characters in the view finder, as shown in FIGS. 6A and 6B or in FIGS. 7B and 7C. In another preferred setup, the three kinds, CCU, AF, and local, may be displayed by turning on of respective display lamps.

In the camera system of the first embodiment described above, when the camera unit 2 without the digital serial interface is connected to the lens unit 1 having the serial interface, the focus control mode is automatically set in the local mode. Therefore, the focus control can be performed according to manipulation of the focus demand 13 connected to the lens unit 1 from the time of power on even in such a combination of the lens unit with the camera unit.

Second Embodiment

Figure 8:
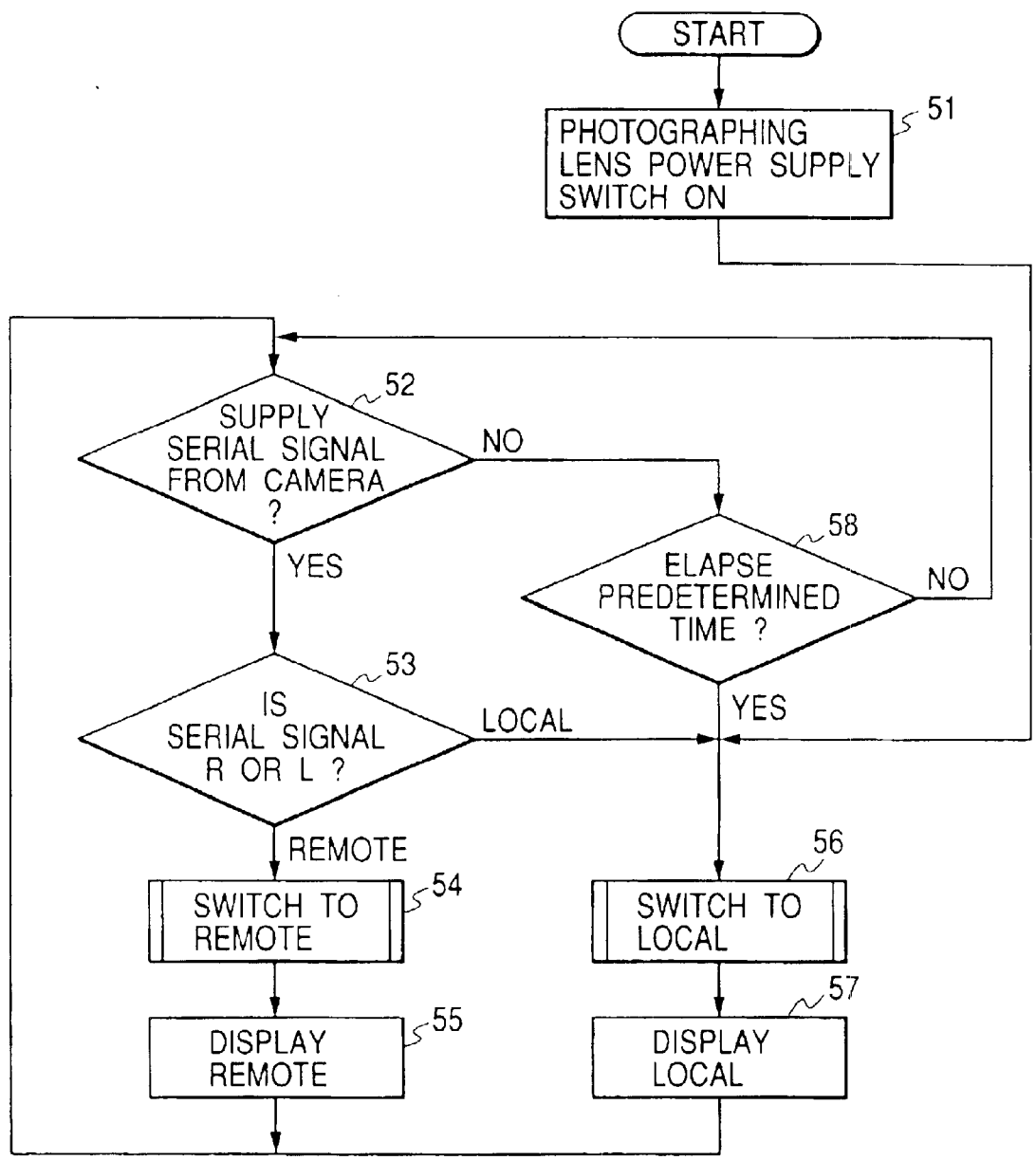
FIG. 8 is an operation flowchart of a lens unit, which is the second embodiment of the present invention.

FIG. 8 illustrates a focus control mode setting program of the lens unit 1 in a camera system of the second embodiment according to the present invention. Fundamental constituent elements (steps) of this program are substantially the same as those in the program of the first embodiment, and therefore redundant description will be omitted by denoting the common elements by the same reference symbols. The present embodiment is different from the first embodiment in that the flow goes to step 56 immediately after detection of power on of the lens unit 1 in step 51, to set the local mode.

After the local mode is set and displayed in step 56 and step 57, the flow goes to step 52 to determine whether a serial signal is input from the camera unit. When no input of serial signal is given after a lapse of the predetermined time in step 58, the flow returns to step 56 to maintain the setting of the local mode. On the other hand, when a serial signal is input from the camera unit, the flow goes to step 54 and step 55 to switch the mode into the remote mode and display the remote mode.

By employing the arrangement wherein the local mode is first set by turning on of power as described, the cameraman, even using the camera unit 2 without the serial interface, can start the focus operation while manipulating the focus demand 13 connected to the lens unit 1 immediately after turning on of power.

The first and second embodiments above were described as to the remote/local setting of the focus control mode, but the present invention can also be applied to remote/local setting of diaphragm (iris) control, variable focus (zoom) control, and macro and variable power lens (extender) control modes, and so on.

In the embodiments changeover of mode is carried out by detecting the signal from the CCU through the camera by the CPUa 12 of lens, but the mode changeover may also be carried out by direct communication from the CCU with the CPUa 12 of the lens unit.

What is claimed is:

1. A lens unit to be connected to a camera unit, said lens unit comprising:
   a serial interface;
   a control circuit having a first mode in which driving control is effected according to a signal from the camera unit and a second mode in which operation control is effected according to a signal from said lens unit; and
   a setting circuit for detecting communication through said serial interface of a signal from the camera unit at power on of a power supply of said lens unit and automatically setting the second mode in a case that the camera unit does not include a serial interface, resulting in the communication being absent.

2. The lens unit according to claim 1, wherein said setting circuit sets a mode according to a communication signal transmitted when the communication is present.

3. The lens unit according to claim 1, wherein said setting circuit sets the second mode when the communication is absent with a lapse of a predetermined time or more from the time of power on of the power supply.

4. The lens unit according to claim 1, wherein said setting circuit sets the second mode when communication of a signal for specifying a mode is absent.

5. The lens unit according to claim 1, wherein said lens unit comprises indication means for indicating a mode set by said setting circuit.

6. A camera system including a camera unit and a lens unit to be connected to said camera unit, wherein said lens unit includes a serial interface, said camera system comprising:

a control circuit having a first mode in which driving control is effected according to a signal from said camera unit and a second mode in which operation control is effected according to a signal from said lens unit; and a setting circuit for detecting communication through said serial interface of a signal from said camera unit at power on of a power supply of said lens unit and automatically setting the second mode in a case that the camera unit does not include a serial interface, resulting in the communication being absent, wherein said control circuit and setting circuit are disposed in said lens unit.

7. The camera system according to claim 6, wherein said setting circuit sets a mode according to a communication signal transmitted when the communication is present.

8. The camera system according to claim 6, wherein said setting circuit sets the second mode when the communication is absent with a lapse of a predetermined time or more from the time of power on of the power supply.

9. The camera system according to claim 6, wherein said setting circuit sets the second mode when communication of a signal for specifying a mode is absent.

10. The camera system according to claim 6, wherein said lens unit comprises indication means for indicating a mode set by said setting circuit.

11. The camera system according to claim 6, wherein said camera unit comprises indication means for indicating a mode set by said setting circuit.

12. A lens unit to be connected to a camera unit, said lens unit comprising:

a serial interface;

a control circuit having a first mode in which driving control is effected according to a signal from the camera unit and a second mode in which operation control is effected according to a signal from said lens unit; and a setting circuit for automatically setting the second mode at power on of a power supply of said lens unit and for thereafter detecting serial communication through said serial interface of a digital signal from the camera unit, such that, in a case that the camera unit does not include a serial interface, resulting in the communication being absent, said setting circuit maintains the second mode.

13. The lens unit according to claim 12, wherein said setting circuit sets a mode according to a communication signal transmitted when the communication is present.

14. The lens unit according to claim 12, wherein said setting circuit maintains the second mode when the communication is absent with a lapse of a predetermined time or more from the time of power on of the power supply.

15. The lens unit according to claim 12, wherein said setting circuit sets the second mode when communication of a signal for specifying a mode is absent.

16. A camera system including a camera unit and a lens unit to be connected to said camera unit, wherein said lens unit includes a serial interface, said camera system comprising:

a control circuit having a first mode in which driving control is effected according to a signal from said camera unit and a second mode in which operation control is effected according to a signal from said lens unit; and a setting circuit for automatically setting the second mode at power on of a power supply of said lens unit and for thereafter detecting communication through said serial interface of a signal from said camera unit, such that, in a case that the camera unit does not include a serial interface, resulting in the communication being absent, said setting circuit maintains the second mode, wherein said control circuit and setting circuit are disposed in said lens unit.

17. The camera system according to claim 16, wherein said setting circuit maintains the second mode when the communication is absent with a lapse of a predetermined time or more from the time of power on of the power supply.

18. The camera system according to claim 16, wherein said setting circuit maintains the second mode when communication of a signal for specifying a mode is absent.

19. The lens unit according to claim 1, wherein the operation control is driving control.

20. The lens unit according to claim 1, wherein both the driving control and the operation control are focus control.

21. The camera system according to claim 6, wherein the operation control is driving control.

22. The camera system according to claim 6, wherein both the driving control and the operation control are focus control.

23. The lens unit according to claim 12, wherein the operation control is driving control.

24. The lens unit according to claim 12, wherein both the driving control and the operation control are focus control.

25. The camera system according to claim 16, wherein the operation control is driving control.

26. The camera system according to claim 16, wherein both the driving control and the operation control are focus control.

27. A lens unit to be connected to a camera unit, said lens unit comprising:

a serial interface;

a control circuit having a first mode in which driving control is effected according to a signal from outside the lens unit and a second mode in which operation control is effected according to a signal from said lens unit; and a setting circuit for detecting communication through said serial interface of a signal from the camera unit at power on of a power supply of said lens unit and automatically setting the second mode in a case that the camera unit does not include a serial interface, resulting in the communication being absent.

28. The lens unit according to claim 27, wherein the signal from outside the lens unit is a signal from a focus instruction means.

* * * * *